(12) United States Patent
Thiessen et al.

(10) Patent No.: US 7,497,493 B1
(45) Date of Patent: Mar. 3, 2009

(54) PICK UP TRUCK LOAD RACK

(75) Inventors: Jeffrey S. Thiessen, Champlin, MN (US); John M. Enga, Rogers, MN (US)

(73) Assignee: Geneva Group of Companies, Inc., Minneapolis, MN (US)

( * ) Notice: Subject to any disclaimer, the term of this patent is extended or adjusted under 35 U.S.C. 154(b) by 273 days.

(21) Appl. No.: 11/553,654

(22) Filed: Oct. 27, 2006

Related U.S. Application Data

(60) Provisional application No. 60/731,355, filed on Oct. 28, 2005.

(51) Int. Cl.
*B60P 3/00* (2006.01)
(52) U.S. Cl. ............................................. 296/3; 296/98
(58) Field of Classification Search ....................... 296/3, 296/136.03, 100.02, 100.03, 98
See application file for complete search history.

(56) References Cited

U.S. PATENT DOCUMENTS

| 5,494,327 | A | 2/1996 | Derecktor |
| D410,429 | S | 6/1999 | Derecktor |
| 6,059,159 | A * | 5/2000 | Fisher ......................... 224/403 |
| 6,547,311 | B1 | 4/2003 | Derecktor |
| 2003/0193209 | A1 * | 10/2003 | Melvani ................. 296/100.02 |

* cited by examiner

*Primary Examiner*—Lori L Lyjak
(74) *Attorney, Agent, or Firm*—Moore & Hansen, PLLP

(57) ABSTRACT

A carrying rack for transporting sporting or work equipment over a pickup truck bed while utilizing relatively lighter weight materials is disclosed. The carrying rack utilizes the space above the pickup truck bed so the pickup truck bed may be enclosed with a tonneau. The carrying rack incorporates tracks which are easily installed and removed without requiring drilling or other modifications to the pickup truck bed. The carrying rack tracks allow for uprights and cross members to be attached when in use. The carrying rack is mounted to the pickup truck bed so the tonneau cover may be rolled up without removing the cross members or uprights. The location of the cross bars and uprights on the carrying rack can be adjusted along the length of the carrying rack tracks, thus allowing for attaching equipment such as bicycle carrier, ski carrier, cargo basket, ladder, or other types of equipment. In some embodiments, the lateral position of the tracks can be varied as well. The carrying rack allows the pickup truck bed space to be used for other purposes while transporting sporting or other equipment.

27 Claims, 13 Drawing Sheets

PICK UP TRUCK LOAD RACK

RELATED APPLICATIONS

The present application is a non-provisional of U.S. Provisional Patent Application No. 60/731,355, filed Oct. 28, 2005, entitled PICKUP TRUCK LOAD RACK, herein incorporated by reference in its entirety.

FIELD OF THE INVENTION

This invention relates generally to carrying racks for pickup trucks. More particularly, the present invention relates to such pickup truck carrying racks that elevate crossbars over the top of the truck's cargo bed without requiring drilling or other modifications to the truck, including the bedrails, and which are easily installed and can be adjusted along the length of the bed. Such crossbars can be used for transporting bicycles, cargo baskets, ladders, ski carriers, sporting or work equipment over a pickup truck bed.

BACKGROUND

As is generally known, pickup trucks are utilized for transporting materials, sporting equipment, and other supplies. Although pickup trucks have a rear cargo area that can carry a variety of materials, many people prefer to use a carrying rack to carry some of these items. The use of a carrying rack provides additional carrying capacity for the pickup truck, proper and convenient transportation of items, and frees up the rear cargo area. Many different types of pickup truck carrying racks exist. Some carrying racks are intended for use within a pickup truck bed while other carrying racks are roof oriented and mount permanently to the bed rails and or the bed floor. Despite the variety of prior carrying racks, none allow for quick and easy installation and use over an open pickup bed or tonneau cover, while providing for the attachment of bicycles, ladder, cargo baskets or other equipment for transport.

SUMMARY

The carrying rack in one embodiment of the present invention includes two elongate track members or rails that are attached to the side walls of the truck bed. Uprights can be attached to the track members and extend upward and inward from the track members to support one or more cross members. The cross members can be moved forward in the truck bed when not in use. The cross members are intended to be elevated so a tonneau cover can be rolled up or folded.

In some embodiments, lateral position of the elongate track members is varied through use of an internal grooved channel extending along the track member together with a corresponding insert member, which can be inserted at one of several lateral depths into the track member to fix lateral position of the track member relative to the truck bed sidewalls. Some such embodiments can include a first clamping mechanism for clamping the insert member (and coupled track member) laterally to the truck bed sidewall as well as a second clamping mechanism for urging the track member vertically downward against the truck bed sidewall. In some embodiments, the first and second clamping mechanisms are combined into to a combination clamping device.

The carrying rack allows for easy transportation of bicycles and other equipment on a pickup truck, while not taking up valuable bed space or sacrificing the tonneau cover. As a particularly advantageous feature the space above the bed is effectively utilized for transporting a load, while avoiding the need to remove a tonneau cover each time equipment is transported.

DESCRIPTION OF THE DRAWINGS

The carrying rack of the present invention is described with reference to the accompanying drawings in which.

DESCRIPTION

Figure 1:
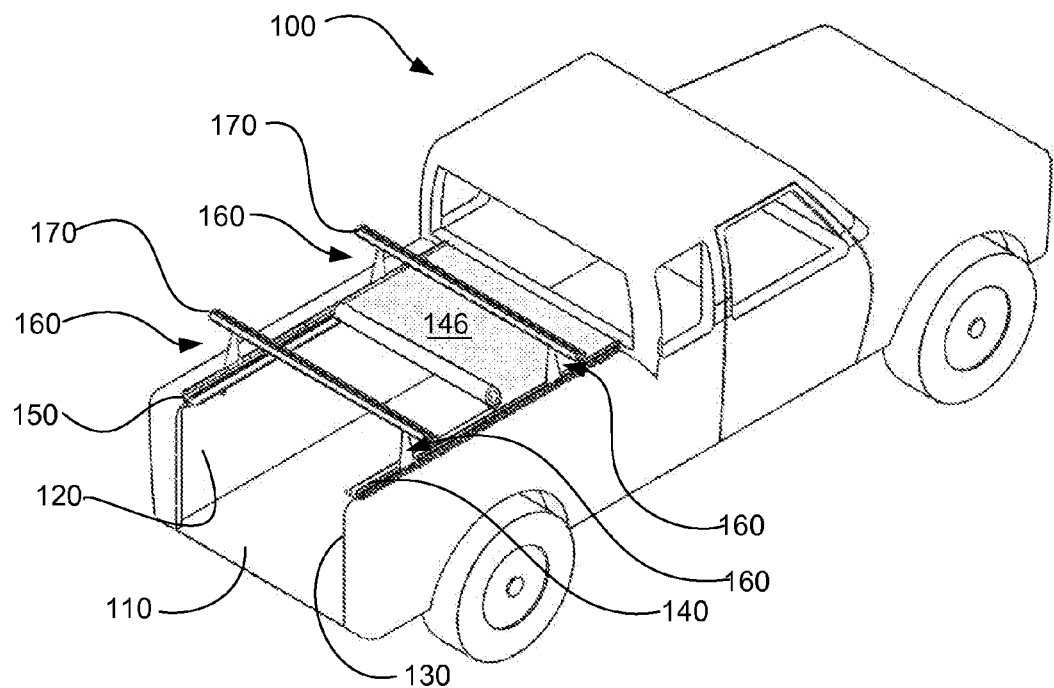
FIG. 1 is a perspective view of a pickup truck having the carrying rack of the present invention mounted thereon.

With reference to FIG. 1, an open bed, generally 110, of a pickup truck 100 has a pair of side walls 120, 130, and tail gate (not illustrated). A track member or rail 150 extends along the upper horizontal margin of side wall 120 and a like track member or rail 140 extends along the length of the upper margin of the other side wall 130. Two spaced cross members 170 are supported by two uprights 160 connected to the track members. Uprights 160 are comprised of vertical and horizontal segments 162 and 164 respectively (shown in FIG. 4). A tonneau cover 146 is shown partially covering truck bed 110.

Figure 2:
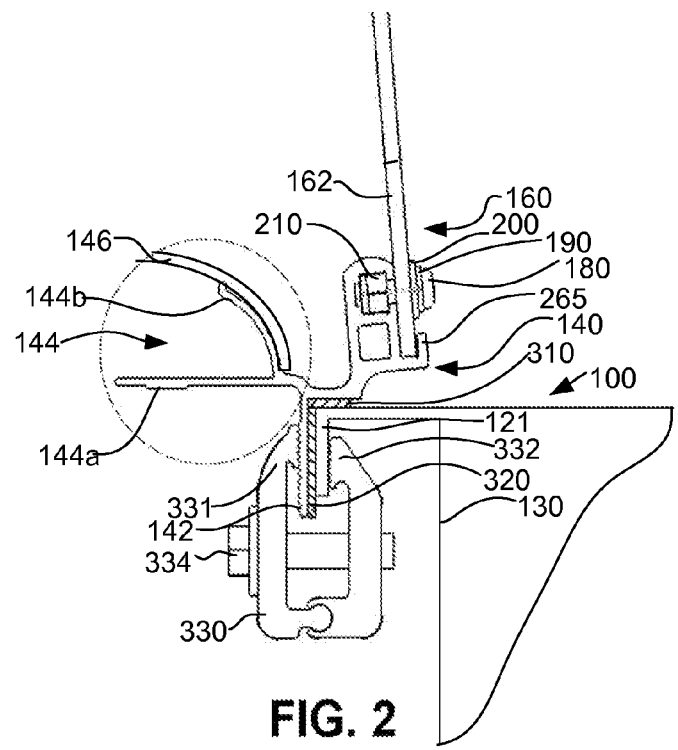
FIG. 2 is a fragmentary rear view of a pickup truck having the carrying rack mounting mechanism in place thereon.

FIG. 2 is a rear view of on an open truck bed showing track member 140 attached to side wall 130 of pickup truck 100 by means of clamp 330. No screws, bolts or other connectors are needed for this purpose apart from clamp 330, which is detachably held in place by bolt 334. There is no requirement for clamp 330 to be of a particular shape or size. The clamps 330 can be positioned along side leg 142 of track member 140 where mounting is most convenient. Clamping jaws 331 and 332 have side tooth faces to enhance the holding action of track leg 142 against the inner, vertical lip 121 of the cargo side wall 130. Gasket 310 and gasket 320 provide a seal to prevent moisture from entering the truck bed when used in conjunction with a tonneau cover 146 and to prevent damage to pickup truck 100 during use. Side rail 144 of track member 140 is shown incorporating a configuration with inwardly projecting segments 144a and 144b that will accept a tonneau cover 146 as shown in FIG. 2. The design of rail 144 can be many shapes that will accept a corresponding tonneau cover. See, for example, FIG. 11 of U.S. Pat. No. 5,076,338 and the related description.

Figure 3:
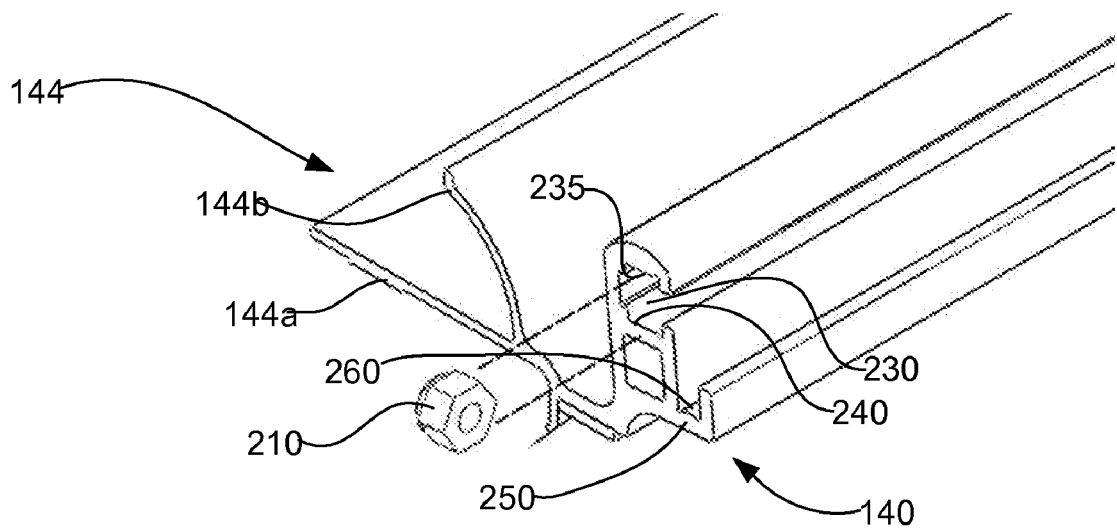
FIG. 3 is a perspective view of a tonneau cover track member contoured to support the load rack of this invention.

With reference to FIG. 3, slotted channel 230 of the track member 140 is designed with internal faces 235 and 240 which run the length of track member 140 to frictionally engage the edges of nut 210 inserted into channel 230.

Figure 4:
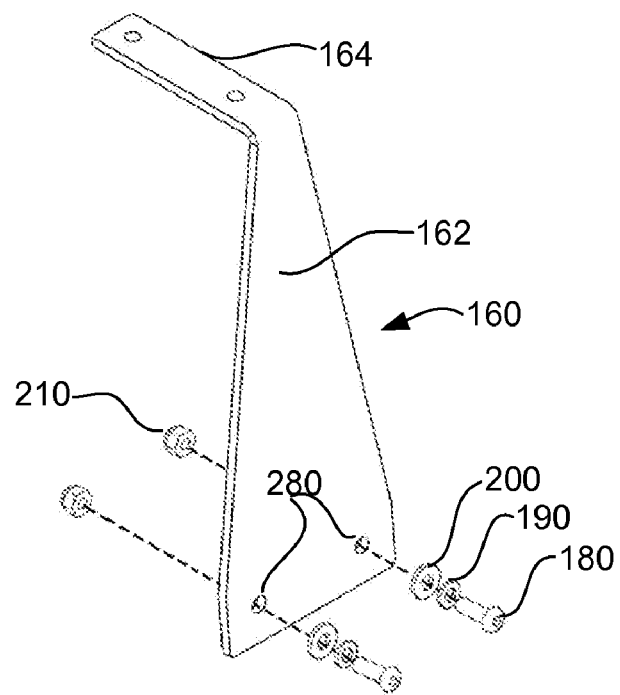
FIG. 4 is perspective view of a load rack upright and the components for mounting the upright to the track member.

With reference to FIG. 4, upright 160 has spaced apart apertures 280 formed along the bottom. Screws 180 pass through washers 190 and 200 and apertures 280 into threaded engagement with nuts 210.

Figure 5:
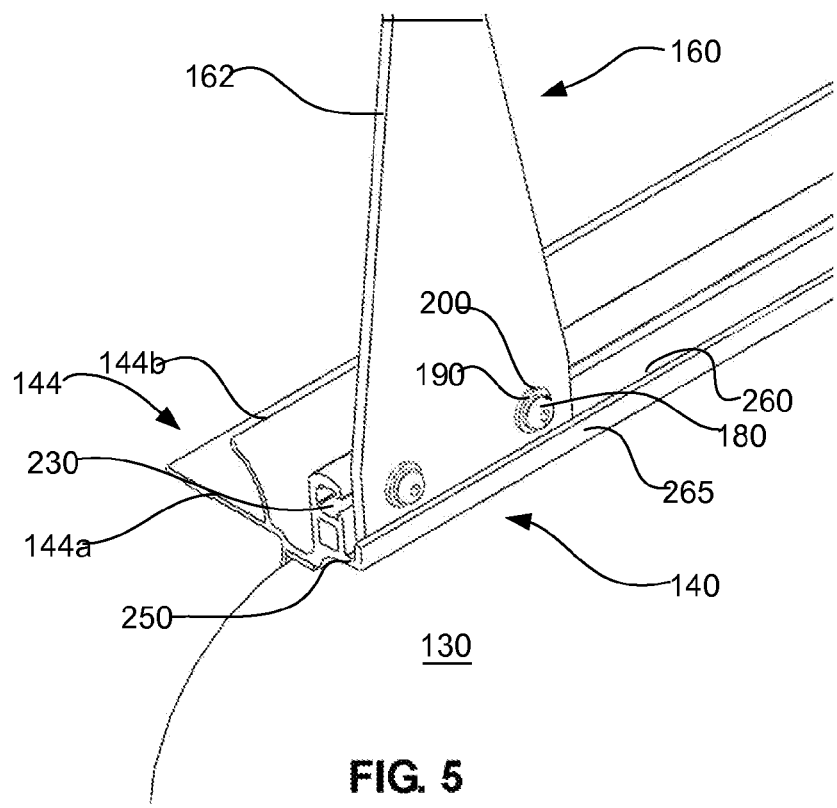
FIG. 5 is perspective view of the upright mounted to the track member.

With reference to FIG. 5, uprights 160 nest in slots or grooves 260 of track members 140 and 150 (not shown in FIG. 5). Upright 160 is supported in the vertical orientation shown by edge 250 of track member 140 and is prevented from falling out of slot 260 by vertical flange 265 of track member 140. Upright 160 can be slidably adjusted or moved along slot 260 of track member 140 to a position that is convenient for use of the carrying rack. Uprights 160 are attached to track members 140 (and 150) by screws 180 passing though through washer 190, washer 200, and apertures 280 of FIG. 4 into nut 210, positioned in slot 230 of the track members.

Figure 6:
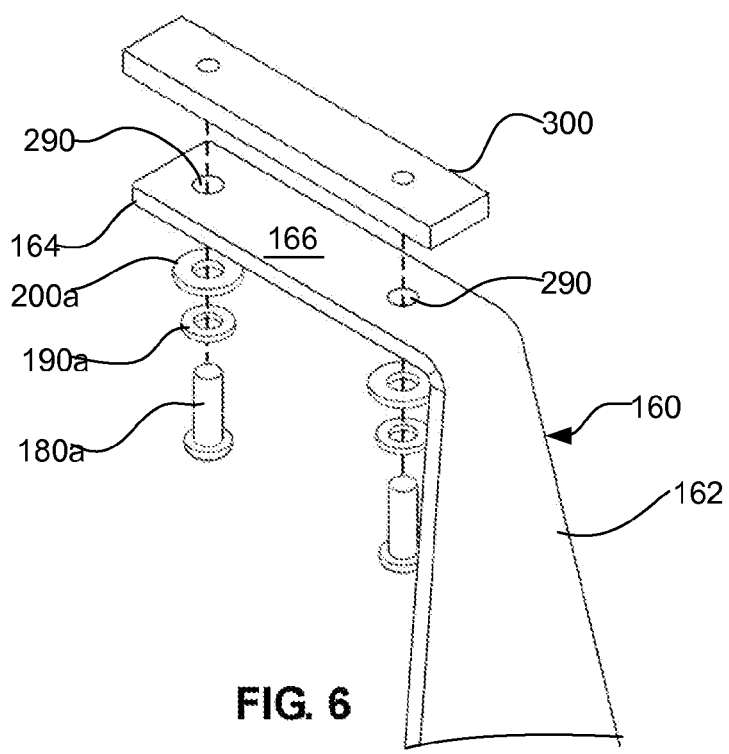
FIG. 6 is a perspective view of the upright components for mounting the crossbar to the upright.

With reference to FIG. 6 uprights 160 have spaced apart apertures 290 formed in a horizontal, top segment 164. Screws 180a pass through washers 190a and 200a and apertures 290 into threaded engagement with threaded apertures of plate 300.

Figure 7:
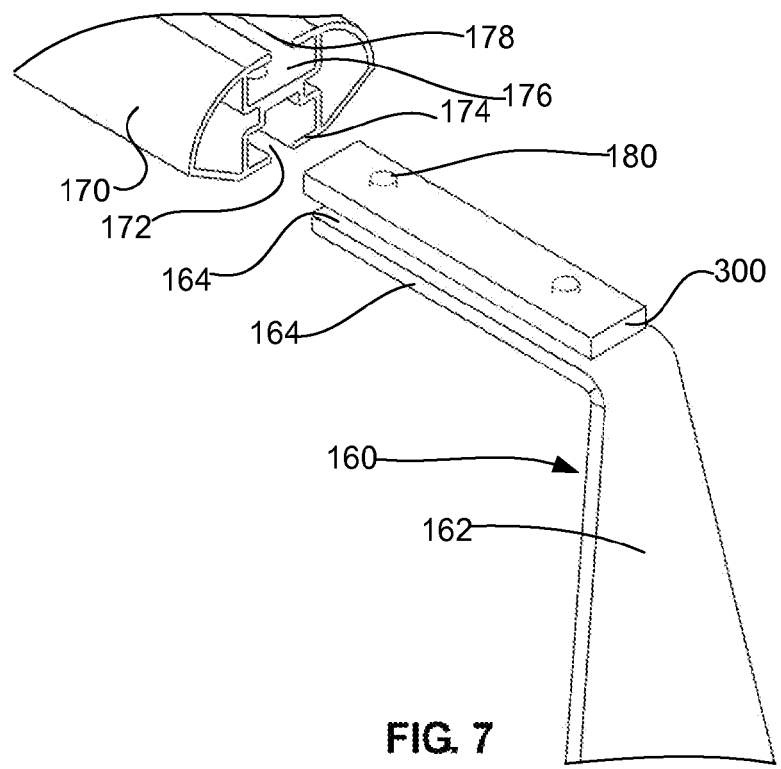
FIG. 7 is a perspective view of the upright components and crossbar.

With reference to FIG. 7, crossbar 170 is oriented so that its through slot 172 can receive plate 300. Crossbar 170 is supported in the vertical direction by surface 174 of crossbar 170 resting on the surface 166 of upright 160. Crossbar 170 can be moved along horizontal top segment 164 of upright 160 to a position that is convenient for use of the carrying rack. Crossbar 170 is attached to upright 160 by screws 180a passing through washers 190a, washers 200a, and apertures of plate 300 (shown in FIG. 6).

Figure 8:
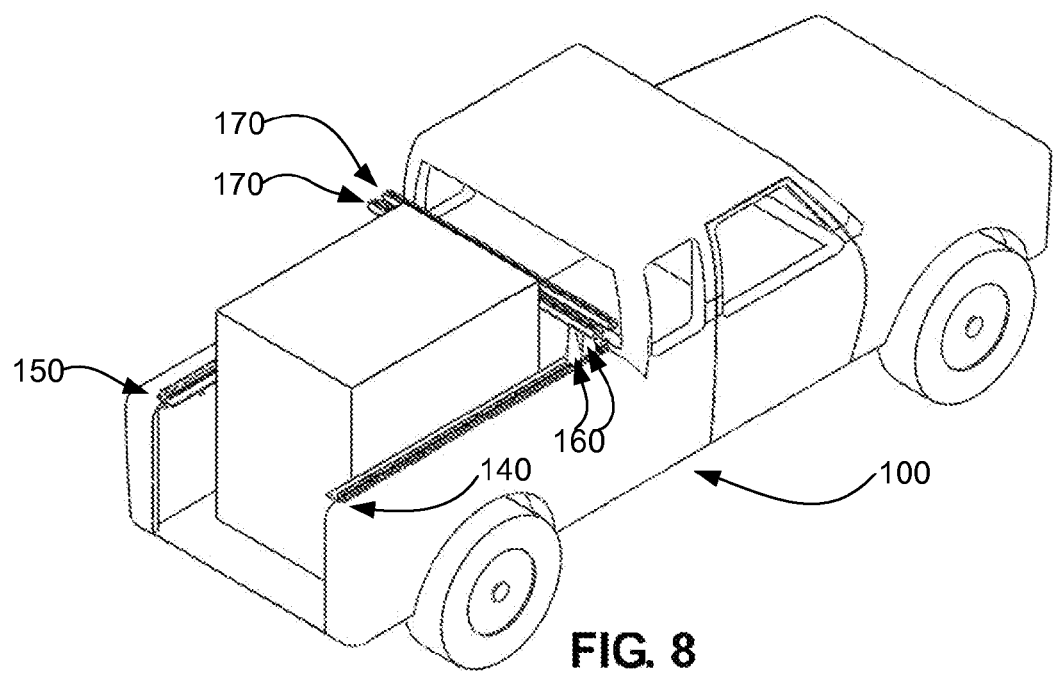
FIG. 8 is a perspective view of the crossbar moved forward to allow use of pickup truck bed without requiring the removal of crossbars.

As shown in FIG. 8, crossbars 170 are positioned to the front of the bed of pickup truck 100. Moving the crossbars forward can allow use of the pickup bed cargo area for cargo that extends greater in height than the crossbars.

Figure 9:
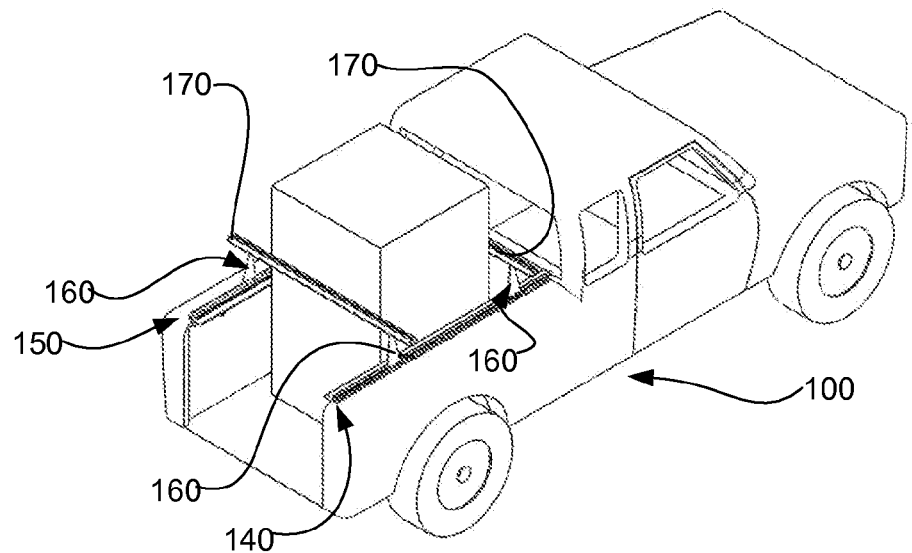
FIG. 9 is a perspective view of the crossbars on either side of a tall box illustrating the purpose of constraining a load from moving forward or backward.

With reference to FIG. 9, crossbars 170 are spaced on either side of a large load to prevent the load from moving forward or backwards in the pickup truck bed.

Figure 10:
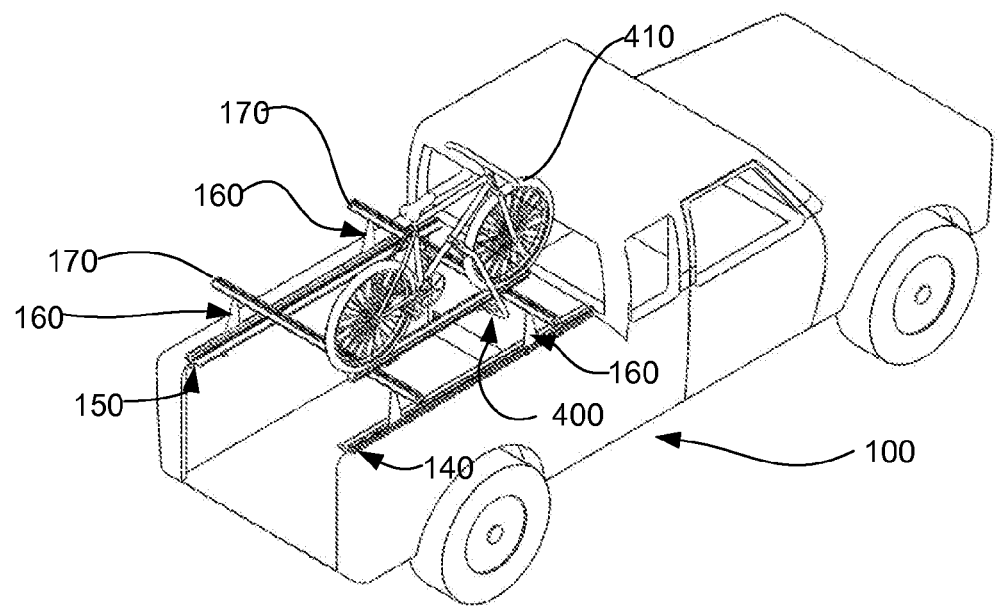
FIG. 10 is a perspective view of the crossbars spaced to accept such equipment as a bicycle carrier.
Figure 11:
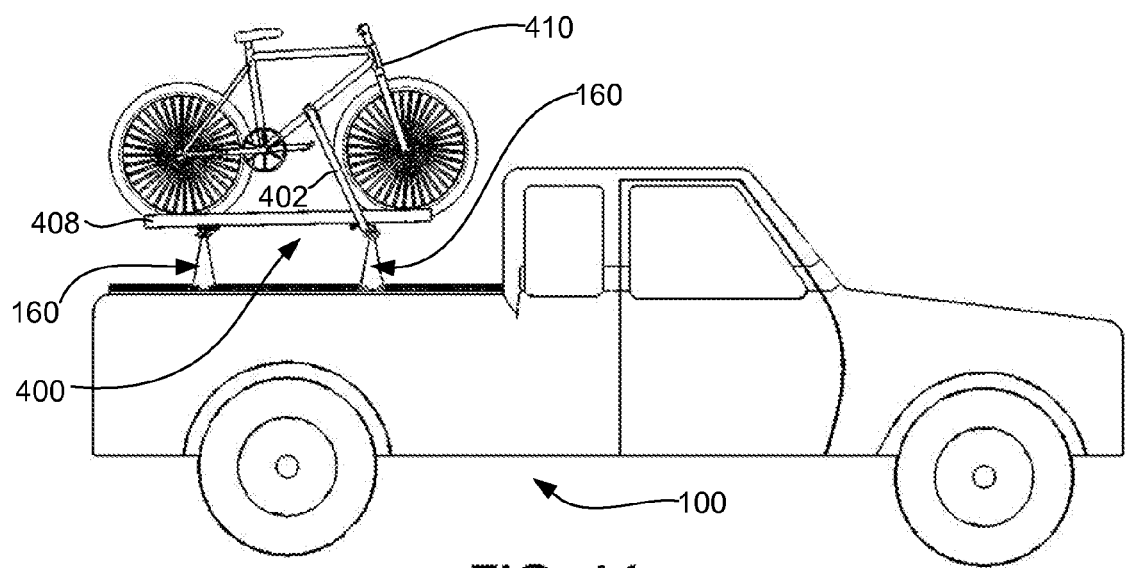
FIG. 11 is a side view of the crossbars spaced to accept such equipment as a bicycle carrier.

FIGS. 10 and 11 show crossbars 170 spaced apart to support sporting equipment such as the bicycle carrier 400 with bicycle 410 thereon. It is to be understood that crossbars 170 may be utilized in various ways to support many different types of loads and equipment above the side walls of the truck cargo bed. Bicycle carrier 400 is shown by way of example. In that carrier application, an inclined clamping bar 402 may be releasably attached to the frame tube of a bicycle 410 as show. The front and rear wheels of the bicycle are carried in the channel of a bar 408.

Figure 12A:
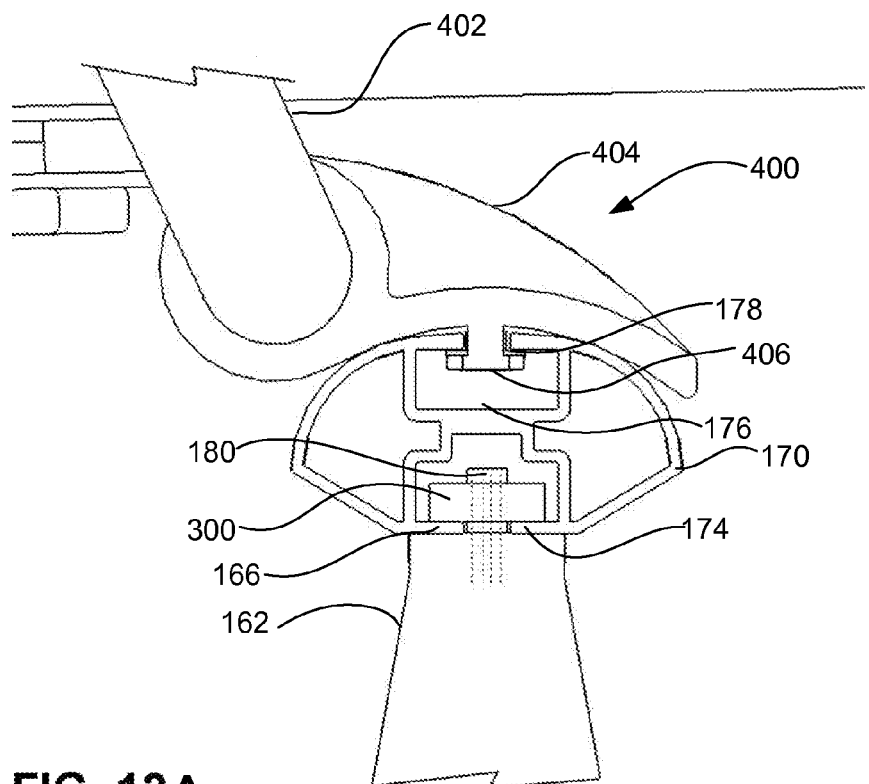
FIG. 12A is a side elevation view showing the front end of the bicycle carrier of FIG. 11 mounted to a crossbar.
Figure 12B:
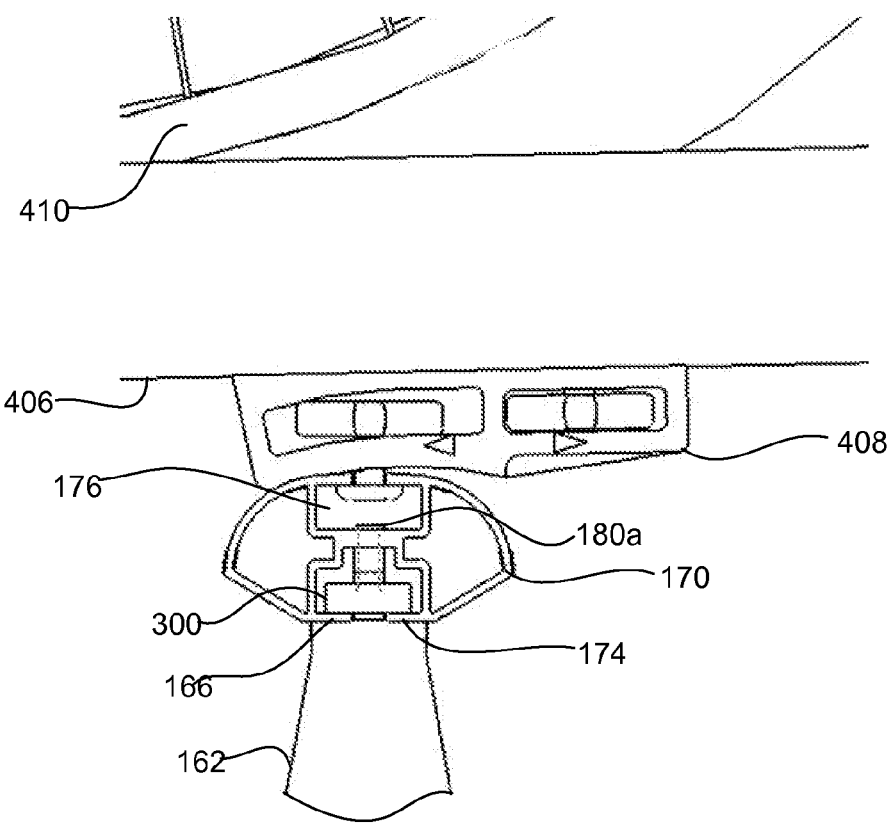
FIG. 12B is a side elevation view sowing the rear end of the bicycle carrier of FIG. 11 mounted to a crossbar.

FIGS. 12A and 12B further illustrate carrier 400, bicycle bar 408, and bicycle 410. FIG. 12A shows the front end of carrier 400 secured in place, with crossbar 170 cross bar surface 174 resting on upright 160. A foot block 404 on the lower end of clamping bar 402 may be releasably secured within upwardly facing channel 176 of one of the cross bars 170 using a known type of carrier clamp in conjunction with bolt 406. Bolt 406 passes through slot 178 of channel 176. Screw 180 passes through plate 300. Any suitable clamping means may be used to releasably secure the rear end of bicycle carrier bar 408 on spaced apart cross bar 170.

FIG. 12B illustrates the rear end of carrier 400, including bicycle 410, bicycle bar 408, and vertical flange 162 of upright 160 supporting crossbar 170. Plate 300, upright horizontal surface 166, crossbar surface 174, channel 176, and channel slot 178, and screw 180a are as previously described.

Figure 13:
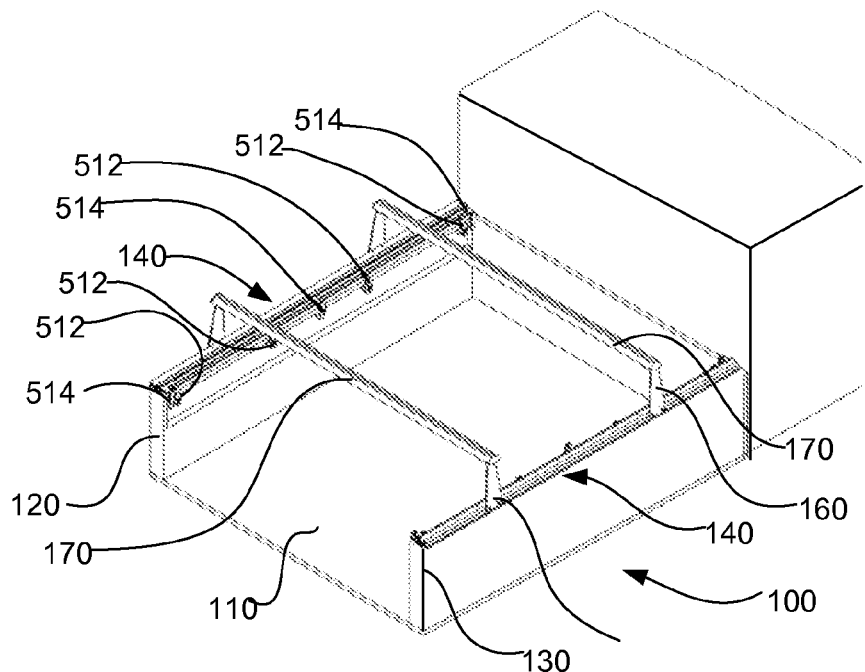
FIG. 13 is rear perspective view of another system according to the present invention mounted on a pickup truck sidewall, having a laterally adjustable elongate tonneau cover attachment region and elongate upright support device clamped to the truck sidewall by a first clamp for adjustably fixing the lateral position and a second clamp for urging the elongate device downward against the sidewall top portion.
Figure 13A:
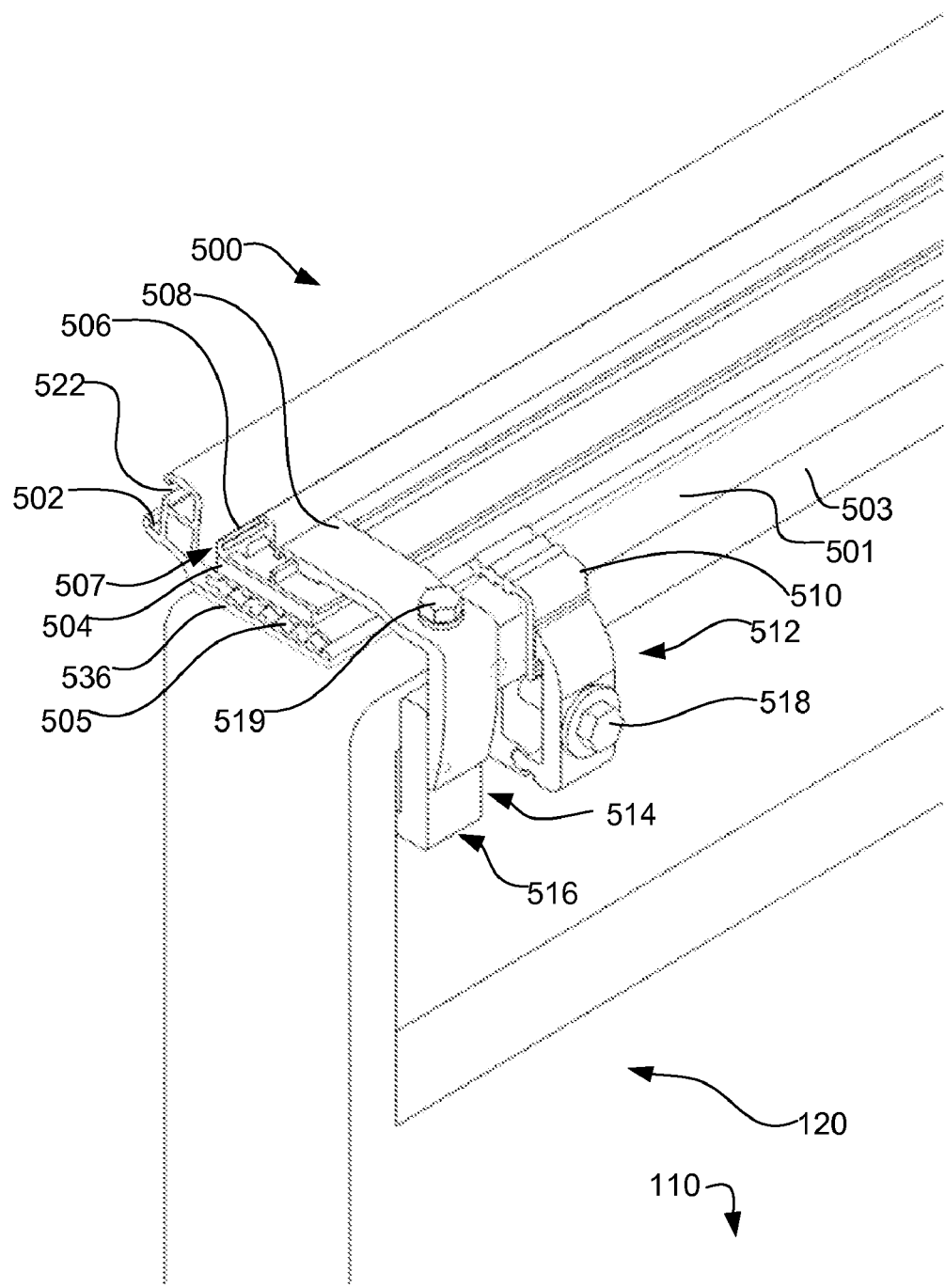
FIG. 13A is a fragmentary perspective view of the rack and tonneau cover mounting structure of FIG. 13.

FIGS. 13 and 13A illustrate another embodiment of the invention providing laterally adjustable positions for the load support structure on top of the sidewalls of the cargo bed of a pickup truck. An elongate longitudinal member or rail 500 includes an exterior groove 520 for supporting an upright member 160, an external slotted channel 522, and a longitudinal tonneau cover attachment region 506 for releasably securing a tonneau cover. Elongate longitudinal member 500 is secured to a pickup truck having a cargo bed 110 and a sidewall 120 having a top portion 501 and an inner vertical portion 121.

An insert member 510 extends within an interior slot 505 in elongate longitudinal member 500 for adjustably securing the lateral position of elongate longitudinal member 500. Internal slot 505 includes several longitudinal teeth separated by grooves, where the teeth are rectangular in this embodiment. The teeth are sized to allow the teeth of insert member 510 to longitudinally slide therebetween. A first clamping mechanism 512 is used to clamp insert member 510 and therefore elongate member 500 in a fixed lateral position relative to sidewall 120. A tensioning member, here a bolt, 518 is used in the clamping, together with jaws, described below. A securing member 508 of a second clamping mechanism 514 is used to force elongate longitudinal member 500 downward against sidewall top portion 501 in a vertical clamping action. A tensioning member, here a threaded bolt, 519, is used in this clamping to urge a U-shaped member 516 upward toward sidewall top portion 501, with members 508 and 516 serving to achieve the vertical clamping.

In this embodiment, an elongate longitudinal tonneau attachment member or rail 507 carries the tonneau attachment segment 506. A resilient foam or gasket layer 504 separates tonneau attachment member 507 from a horizontal portion of elongate longitudinal member 500 in this embodiment.

Another gasket or foam layer 536 is used in this embodiment to separate elongate longitudinal member 500 from sidewall top portion 501 for cushioning, sealing, and protective purposes.

Figure 14:
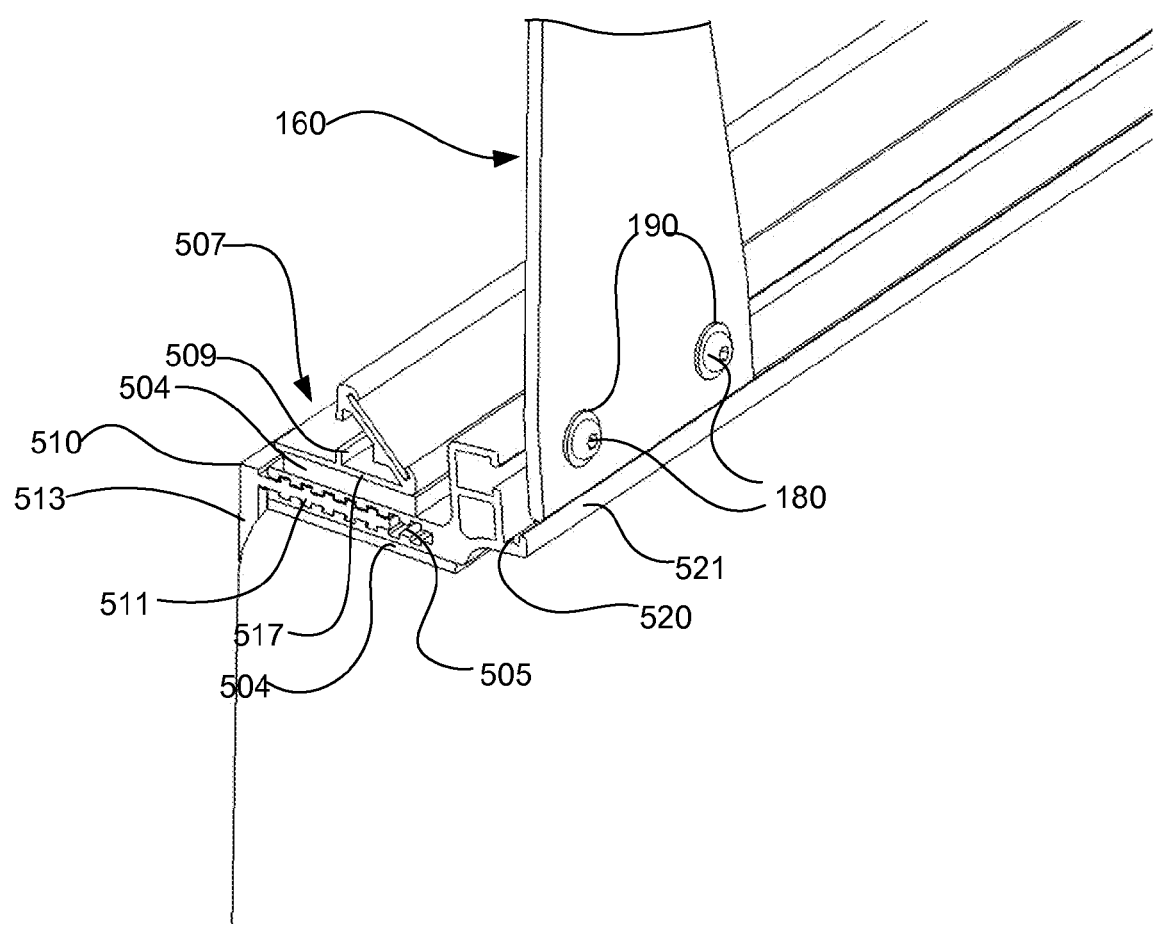
FIG. 14 is a fragmentary perspective view of the system of FIG. 13, having an upright secured within an external groove of a track member.

FIG. 14 shows the embodiment of FIG. 13 as viewed from the outside of cargo bed side wall 130. Upright member 160 is secured to a nut (not shown in FIG. 14) disposed within slotted channel 522 using bolts 180 and washers 190 in the manner described with respect to the embodiment of FIGS. 1-12. Upright member 160 rests within external groove 520 having lip 521. Longitudinal tonneau attachment member or rail 507 includes the tonneau cover attachment segment 506, and a bottom portion 517 having a vertical ridge 509 in this embodiment. Tonneau cover attachment segment 506 can include any releasable attachment mechanism, for example, hook or loop fasteners, grommets, snaps, and the like. Internal lateral slot 505 having several teeth may be seen receiving a lateral portion 511 of insert member 510, which also includes a vertical portion 513 extending downward and bearing against the inside face of side wall 130.

Figure 15:
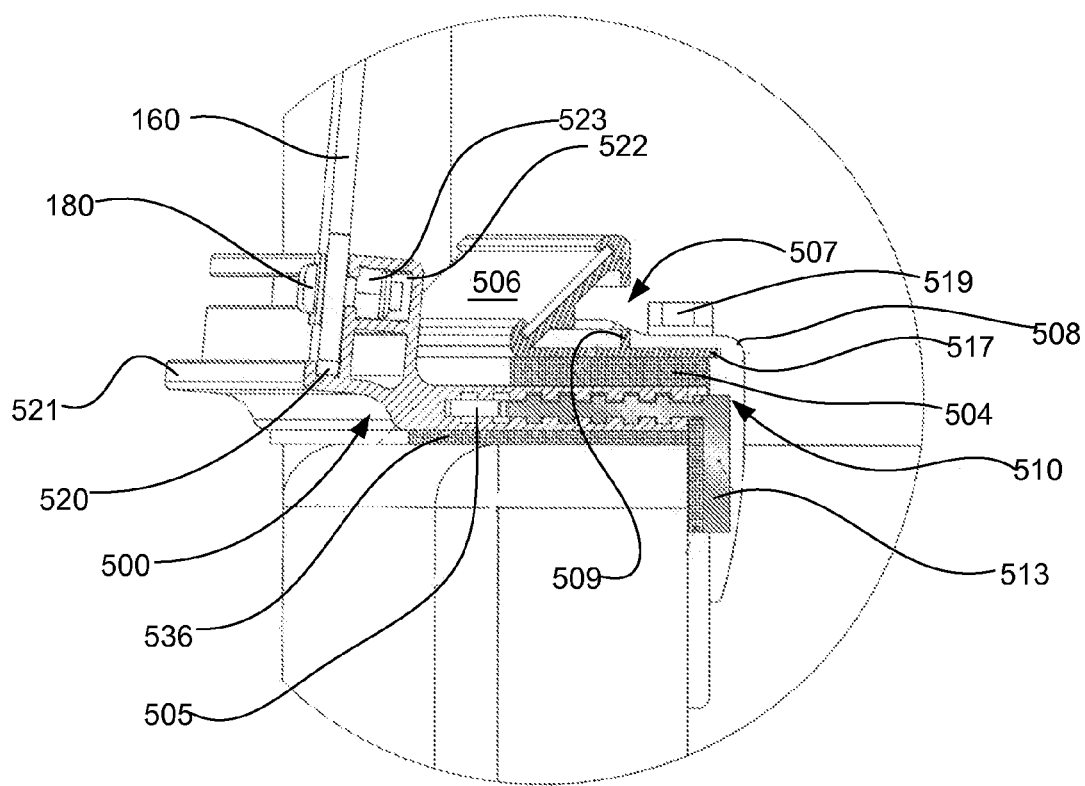
FIG. 15 is a fragmentary, perspective, cross-sectional view of the system of FIG. 13, showing the upright secured to the track member using nuts disposed within an external slotted channel.

FIG. 15 is another view of the embodiment of FIG. 13, including upright member 160 supported by groove 520 and lip 521. A bolt 180 extends through upright member 160 and is threadably secured to a nut 523 disposed within slotted channel 522. Channel 522 can serve to prevent nut 523 from rotating, allowing nut 523 to better serve as an anchoring element to provide tension in concert with bolt 180. Tonneau attachment segment 506 and tonneau attachment member bottom portion 517 are shown as is ridge 509. Foam or gasket 504 is disposed beneath tonneau attachment elongate member bottom portion 517. Foam or gasket layer 536 is disposed above sidewall top portion 501 and under rail 500. Insert member 510 is disposed within internal slot 505 as shown. Bolt 519 provides downward tension to securing member 508 which urges elongate longitudinal member 500 against sidewall top portion 501.

Figure 16:
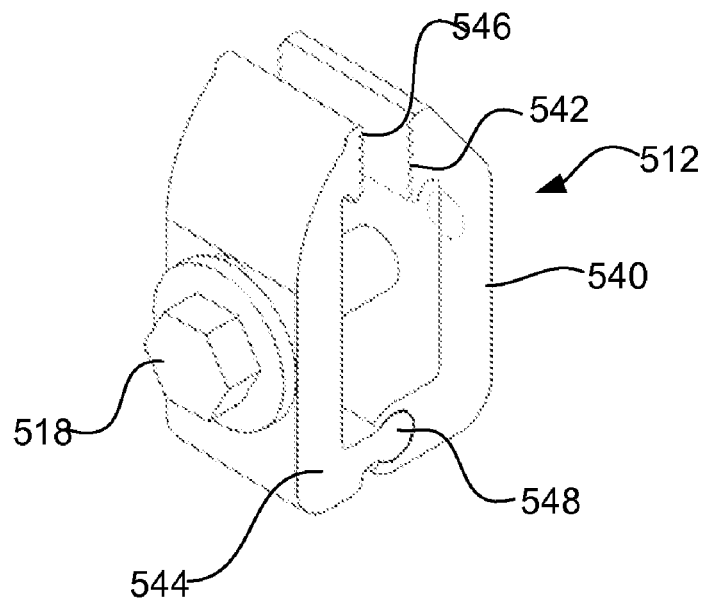
FIG. 16 is a perspective view of a first clamping mechanism of FIG. 13, for clamping a lateral insert member in place.

FIG. 16 illustrates first clamping mechanism 512 in more detail, including bolt 518 urging a first jaw 544 having teeth 546 toward a second jaw 540 having teeth 542. Jaws 544 and 540 are pivotally joined to each other at pivot joint 548. First clamping mechanism 512 can be used to clamp the downwardly extending portion 513 of the insert member 510 to the inner sidewall vertical portion to fix the lateral position of elongate member 500.

Figure 17:
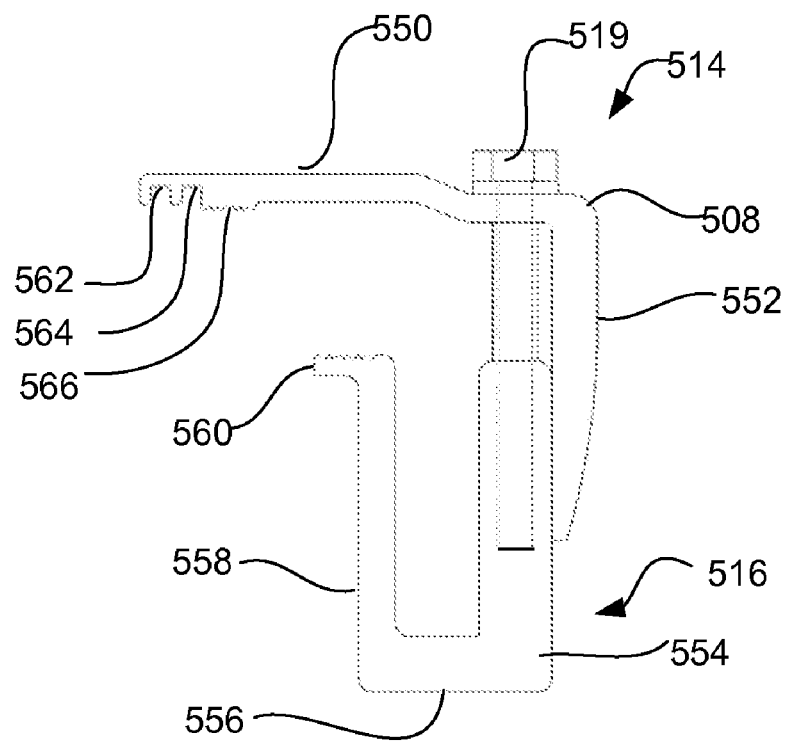
FIG. 17 is a perspective view of a second clamping mechanism of FIG. 13, for clamping a track member against the sidewall top portion of a cargo bed.

FIG. 17 illustrates second clamping mechanism 514 in more detail, including bolt 519, and securing member 508 having a horizontal portion 550 and a vertical portion 552. Horizontal portion 550 can include longitudinal grooves 562 and 564 to couple to ridge 509 (shown in FIG. 15) to allow some variation in lateral position of the clamping mechanism. Horizontal portion 550 can also include teeth 566 as shown. U-shaped portion 516 includes an inner vertical portion 554, a bottom horizontal portion 556, and an outer vertical portion 558 terminating in an upper horizontal portion 560 having upwardly extending teeth. Adjustable tensioning bolt 519 can vary the relative position of portions 552 and 554 relative to each other, and also to urge upper portion 560 upward against the interior of the truck sidewall upper portion 501.

Figure 18:
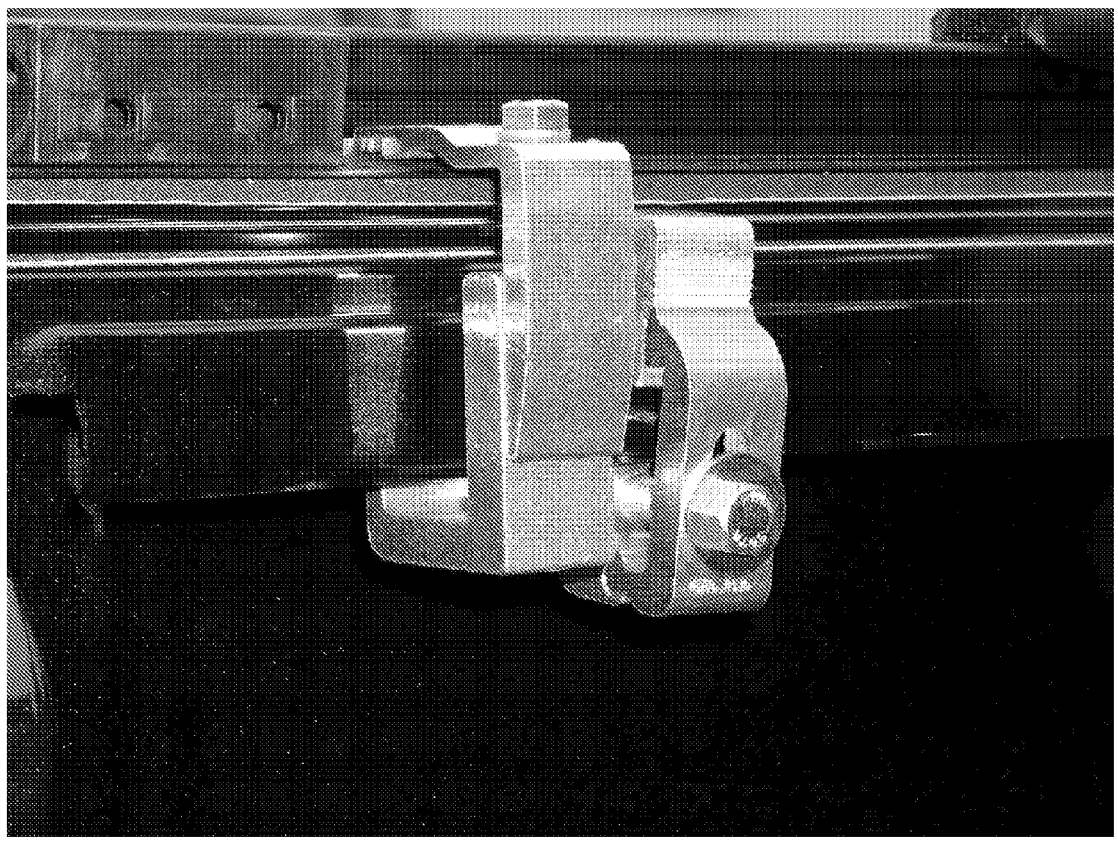
FIG. 18 is a photograph of one embodiment of the invention, showing the first and second clamping mechanisms in a rear, interior view.

FIG. 18 shows a photograph of the two clamping mechanisms in use, securing the elongate member or rail of the present invention to the interior of a pickup truck bed.

Figure 19:
FIG. 19 is a photograph of one embodiment of the invention, showing uprights supporting cross members over a secured tonneau cover, in a rear, exterior view.

FIG. 19 shows a photograph of a pickup truck having the elongate member or rail of the present invention providing support for the upright members as well as for attaching a tonneau cover.

Various examples of devices and methods have been presented in order to illustrate, not limit the present invention. It is anticipated that various modifications will occur to those skilled in the art without departing from the spirit and scope of the invention as defined by the following claims.

The invention claimed is:

1. A structural member for combined use on a pickup truck having a cargo space
    as a tonneau cover attachment device and as a support mounting device for upright members to support a load carrier at an elevated level above the truck cargo space, wherein the cargo space is generally disposed between two longitudinally extending and vertically rising opposed sidewalls, the structural member comprising:
    an elongate member contoured for releasable mounting on top of the side walls of the pickup truck, the member having one side constructed to receive and attach one or more of the upright support members, and the opposite side formed with at least one elongate rail segment for the attachment of one side of a tonneau cover; in which the one side constructed to attach one or more upright support members includes a longitudinal slotted channel to secure the upright support member to the elongate member.

2. The structural member of claim 1, in which the one side constructed to receive and attach one or more upright support members includes a longitudinal groove configured to receive the at least one upright support member.

3. The structural member of claim 2, in which the longitudinal slotted channel is shaped for receiving at least one nut for providing tension to secure the upright support member to the elongate member while inhibiting rotation of the nut.

4. The structural member of claim 1, in which the upright member has a vertical segment with at least one hole therethrough for receiving a fastener for securing the vertical segment to the elongate member.

5. The structural member of claim 1, in which the pickup truck side walls include a substantially vertical inner sidewall lip, in which the structural member includes a substantially vertical lip portion for clamping to the pick up truck sidewall lip.

6. The structural member of claim 1, in which the structural member opposite side includes a releasable fastening mechanism for releasably securing a tonneau cover selected from the group consisting of hook or loop fasteners, grommets, snaps, and combinations thereof.

7. The structural member of claim 4, in which the at least one upright support member includes a substantially horizontal segment for securing to a lateral cross bar member.

8. Apparatus for carrying objects over the cargo bed of a pickup truck, the bed having a pair of generally opposing longitudinal vertical sidewalls having top portions, the apparatus comprising:
    two elongate members, each mountable to a respective sidewall top portion of a pickup truck, and each elongate member having a length dimension;
    a clamping mechanism for securing and releasing each elongate member to a respective cargo bed sidewall;
    a load bearing structure including at least one crossbar member having a length, and at least two upright members for supporting the crossbar member over a pickup truck cargo bed;
    an engaging system for releasably securing the load bearing structure at various selected positions along the length of the elongated members comprising a receiving portion contoured to restrainably receive an upright member; and
    a connection mechanism for releasably attaching each upright member to one of the elongate members, in which the connection mechanism comprises a longitudinal slotted channel to secure the upright member to the elongate member.

9. The apparatus of claim 8, wherein the upright member connection mechanism is shaped to receive a nut in frictional engagement therewith to prevent rotation of the nut.

10. The apparatus of claim 8, wherein the channel has upper and lower wall portions spaced apart a predetermined distance for secure engagement of the nut therebetween.

11. The apparatus of claim 8, wherein the upright member receiving portion on each elongated member comprises a slot extending along the length dimension shaped to nest and support one of the upright members.

12. The apparatus of claim 8, wherein each elongated member further includes a fastening segment to secure a tonneau cover along the length of the elongate member.

13. The apparatus of claim 8, wherein the upright member have horizontally extending segments on the upper ends thereof constructed and arranged to adjustably receive and support one end of the crossbar member thereon.

14. The apparatus of claim 13, wherein the crossbar member includes an upwardly facing portion constructed and arranged for the releasable attachment of a load carrying device thereon.

15. The apparatus of claim 8, wherein the apparatus comprises four of said upright members and two crossbar, whereby two pairs of upright members may be releasably secured at spaced apart locations along the two elongate members, with the upright members of each pair in aligned, opposing relation on opposite sidewalls of a pickup truck cargo bed in position to support one of the crossbars at an elevated level above the cargo bed.

16. A system for securing a tonneau cover to a pickup truck and for supporting a load above the tonneau cover, the pickup truck having a cargo bed disposed between opposing longitudinal sidewalls spaced apart from each other in a lateral dimension, the sidewalls having an outer portion, a top portion, and an inner portion, the top and inner portions each having an interior surface and an exterior surface, the system comprising:
an elongate longitudinal member including an externally accessible longitudinal groove for receiving an upright support member in a plurality of longitudinal positions, wherein the elongate longitudinal member has an interior, longitudinal slot open to the cargo bed;
an insert member including a lateral portion configured to fit within the longitudinal member internal slot to allow the insert member to be slidably received within the interior slot and whereby the insert member may be laterally fixed in a plurality of lateral positions within the internal slot;
a securing member for urging the elongate longitudinal member against the sidewall top portion, the securing member including a lateral portion for extending over the elongate longitudinal member and a substantially vertical portion;
an elongate, longitudinal tonneau cover attachment region on the elongate longitudinal member; and
a first clamping mechanism for urging the securing member toward the sidewall top portion in a vertical clamping action.

17. The system of claim 16, wherein the insert member further comprises a substantially vertical portion adapted to be urged against the sidewall inner portion; and
a second clamping mechanism for clamping the insert member vertical portion against the sidewall inner portion.

18. The system of claim 16, wherein the slot has plurality of spaced apart teeth, and the insert member includes a lateral portion having a plurality of teeth located and configured to engage with the longitudinal member slot teeth to fix the insert member in a laterally adjusted position within the slot.

19. The system of claim 16, in which the first clamping mechanism includes a U-shaped member having a first vertical portion, a lateral portion to extending away from the cargo bed, and a second vertical portion for securing against the sidewall top portion interior surface, the second clamping mechanism further including a tensioning shaft coupled to the securing member and the U-shaped member for drawing the U-shaped member upward to clamp the U-shaped member and attached securing member to the sidewall.

20. The system of claim 16, in which the elongate tonneau cover attachment region is part of a discrete elongate tonneau attachment member, where the tonneau attachment member is urged against the elongate longitudinal member by the first clamping mechanism.

21. The system of claim 19, in which the tensioning shaft includes a threaded shaft rotatably disposed through the securing member lateral portion and threadably secured into the U-shaped member.

22. The system of claim 16, further comprising at least one of the upright support members adapted to be received in, and at least partially supported by, the externally accessible longitudinal groove.

23. The system of claim 16, in which the elongate longitudinal member includes an external slotted groove for longitudinally slidably receiving an anchoring body to allow the upright members to be secured through tension to the elongate member by securing a tension member to both the anchoring body and the upright member and applying tension therebetween.

24. An elongated mount for removable placement atop a vertical sidewall of a pickup truck tonneau, comprising a first side adapted for attachment to the first side of a separate cover for the tonneau, and a second, opposite, side having a sideways opening, longitudinally extending slotted channel to secure a separate upright member to an interior of the slotted channel, in which the upright member supports a separate load carrier elevated above the tonneau.

25. The mount of claim 24, in which the mount further comprises an upwardly opening longitudinal groove configured to hold the upright support.

26. The structural member of claim 25, in which the longitudinal slotted channel is shaped for receiving, but inhibiting rotation of, at least one nut within an interior of the slotted channel to secure the upright support to the mount.

27. The mount of claim 24, in which the upright member receives a fastener for securing the vertical segment to the mount.

* * * * *